United States Patent [19]

Furukawa et al.

[11] Patent Number: 4,898,796
[45] Date of Patent: Feb. 6, 1990

[54] LEAD-ACID STORAGE BATTERY

[75] Inventors: Hiroshi Furukawa; Sachio Uemichi; Toshihiro Isoi; Kenzo Kawakita, all of Takatsuki, Japan

[73] Assignee: Yuasa Battery Co., Ltd., Takatsuki, Japan

[21] Appl. No.: 268,448

[22] Filed: Nov. 8, 1988

[30] Foreign Application Priority Data

Nov. 9, 1987 [JP] Japan .................. 62-282787

[51] Int. Cl.⁴ ............................. H01M 2/02
[52] U.S. Cl. .................. 429/178; 429/180; 429/181
[58] Field of Search ............ 424/123, 178, 180–184

[56] References Cited

U.S. PATENT DOCUMENTS 1,248,768  12/1917  Willard .................. 429/180
2,066,597  1/1937   West .................... 429/180 X
4,448,863  5/1984   Terrell .................. 424/180 X
4,693,948  9/1987   McEwan ................. 429/123 X Primary Examiner—Stephen J. Kalafut
Attorney, Agent, or Firm—Armstrong, Nikaido, Marmelstein, Kubovcik & Murray

[57] ABSTRACT

A lead-acid storage battery includes a connecting terminal assembly which comprises: a bushing made from lead or lead alloy, buried in a cover of the battery in the same process as when the cover is molded, and including a hole into which a pole is fitted; and a connecting terminal made by press working of metal, except for lead or lead alloy, having a good electrical conductivity, having at least one bolt-insertion hole and a space for accommodating a nut, fixed to the upper portion of the bushing, and having a strength resistive to a torque of 40 kg-cm or more caused by a bolt inserted into the bolt-insertion hole.

3 Claims, 2 Drawing Sheets

LEAD-ACID STORAGE BATTERY

BACKGROUND OF THE INVENTION

1. Field of the Invention

The present invention relates to lead-acid storage batteries, and particularly to small or compact lead-acid storage batteries such as those for motorcycles, which use bolt-insertion-holes as connecting terminals, (i.e., holes through which bolts are inserted for connecting wire harnesses to the terminals).

2. Prior Art Disclosure

Generally, lead-acid storage batteries hereinafter referred to as batteries) for motorcycles include small connecting terminals of bolt-fastening type.

The structures of such connecting terminals however incorporate complex structural components. Various proposals for alternative structures have been made. One of the more useful structures proposed and, which has already been actually manufactured is disclosed in the Japanese first laid-open publication No. 54-48048. In this structure, a connecting terminal which includes bolt-insertion holes and a pole having annular convex rims are integrally formed as a single block or piece out of synthetic resin by injection molding. This type of connecting terminal is called with a terminal. During manufacture, when the cover or lid of a battery and the battery container are heated and welded to each other, the connecting terminal block is also welded to the cover.

Although this structure is superior to all other structures at the present time, it has some practical disadvantages as stated below.

(1) Since the connecting terminal, the pole and the annular convex rims are integrally formed as a block by molding, the block has a complicated shape which may result in defects such as unfilled portions, blowholes, cracks, checks, stress-cracks and deficits in the molding process.

(2) In order to avoid the disadvantages stated in the above item (1), manufacture of the connecting terminal block requires special techniques, such as the formation of vent holes in making the metal molds. Thus, the metal molds can be designed and manufactured only by manufacturers having special expertise.

(3) Further, in order to avoid the disadvantages stated in the above item (1), the manufacture of the block requires severe molding conditions. Thus the blocks can be molded only by foundries having excellent molding techniques.

(4) The block of synthetic resin is formed surrounding a bushing. It is impossible to apply a sufficient molding pressure during the molding of the block, because the pole (provided with the terminal) is thin, especially in the small battery, and thus may be bent by the high pressure.

Therefore, the block and the bushing may loosely fit with each other, thereby allowing leakage of electrolyte.

(5) At the same as the cover and the battery container are heated and welded to each other, the block is welded to the cover. The block has, however, relatively large error in the size (i.e., height), so that the block can not be sufficiently welded to the cover if the height is too small. This may cause leakage of the electrolyte, and further may cause breakage of the welded portion. Breakage of the weld may result in sinking of the connecting terminals when an external force or impact is applied to the terminal from the above.

(6) Generally, the battery for a motorcycle has a relatively large cranking current of about 100 ampere. It is therefore necessary to tightly connect wire harnesses at the vehicle side to the terminals of the battery. For this tight connection, a stress corresponding to a torque of 40 kg-cm or more must be applied from the bolt in the bolt-insertion hole to the connecting terminal. The insufficient welding as stated in the above item (5) would result in immediate breakage of the welded portion.

Accordingly, it is an object of the invention to provide a lead-acid storage battery provided with a terminal assembly which can overcome the above-noted disadvantages such that there is no molding damage in the molded products, metal molds can be easily manufactured, the products can be molded without specialized molding techniques, the leakage of electrolyte through the terminal assembly and the sinking therefrom is prevented, and the terminal assembly will not break even if a stress corresponding to the torque of 40 kg-cm or more is applied from the bolt to the assembly.

SUMMARY OF THE INVENTION

According to the invention, a lead-acid storage battery which includes a connecting terminal assembly comprises, a bushing made from lead or lead alloy, buried in the cover of the battery in the same process as when the cover was molded and including a hole into which a pole is fitted; and a connecting terminal made by press working of electrically conductive sheet metal (not lead or lead alloy) having at least one bolt-insertion hole and space for accommodating a nut fixed to the upper portion of the bushing, and having a strength resistive to a torque of 40 kg-cm or more caused by insertion of a belt into the bolt-insertion hole.

DESCRIPTION OF THE PREFERRED EMBODIMENTS

Figure 1:
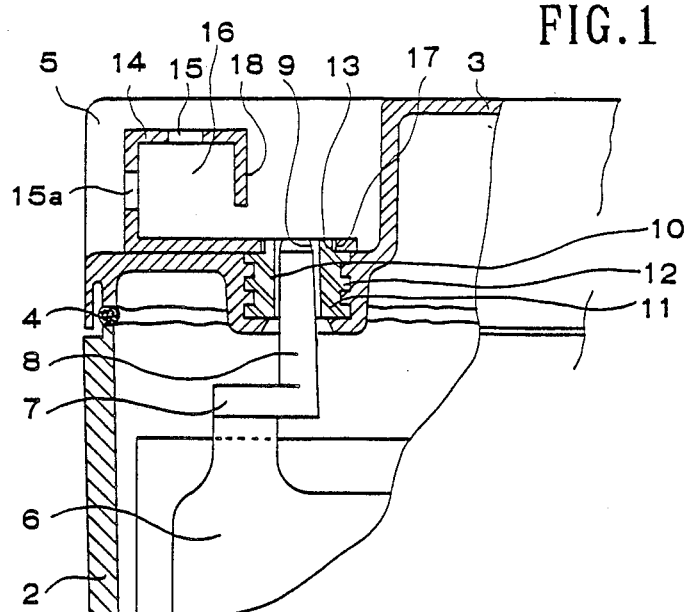
FIG. 1 is a fragmentary sectional view of a lead-acid storage battery according to an embodiment of the invention before fixing a connecting terminal.

Referring to FIG. 1 which illustrates an embodiment of the invention, a lead-acid storage battery 1 includes a battery container 2 and a cover 3 which are made from thermoplastic synthetic resin such as polypropylene, and are heated and welded together at a joint portion 4.

Figure 3:
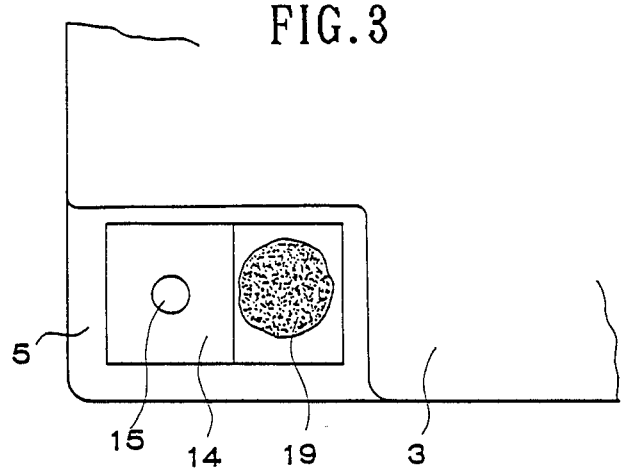
FIG. 3 is a fragmentary plan view of the battery illustrated in FIG. 2.

The cover 3 is provided at two corners of its top surface with recessed or concave portions 5 (which is also clearly shown in FIG. 3). At the numeral 6 is indicated a group of plates including straps 7 (only one is illustrated) to which poles 8 made from lead or lead alloy are electrically and mechanically joined. Each pole 8 projects upwardly from the strap 7, and has an inclined upper end 9 for facilitating insertion thereof into a hole 10 which is formed in a bushing 11. The bushing 11 is made from lead or lead alloy and is provided at the outer peripheral surface with a plurality of vertically spaced annular rims 12 or convex portions. The bushing 11 also has a thin cylindrical edge 13 at its upper end which surrounds the upper end of the hole 10. The bushing 11 is buried in the cover 3 in the injection molding process forming the cover 3. During the molding operation of the cover 3, metal mold core is inserted into the hole 10 in the bushing 11, so that the molding can be performed under a sufficiently high molding pressure. As a result, the bushing 11 buried in the cover 3 tightly and closely contacts the walls of the cover 3.

A connecting terminal 14 is made by the press working of sheet metal (e.g., soft iron or brass, not lead or lead alloy), and includes bolt-insertion holes 15 and 15a as well as a space 16 for accommodating nuts to be fixed to bolts which will be inserted through the holes 15 and 15a. The space 16 for the nuts has a size slightly larger than the length between the opposite side surfaces of the hexagon nut, so that the nut can be inserted therein from the lateral side and the nut will not rotate when the bolt is fastened. The connecting terminal 14 includes a fixing hole 17, in and around which the connecting terminal 14, the pole 8 and the bushing 11 are rigidly fixed to each other. The hole 17 is located at an end of a lower lateral portion or wall of the connecting terminal 14 which is laterally projected beyond a downwardly bent upper end 18. The size of the hole 17 is so determined that the upper edge 13 of the bushing 11 can be fitted therein.

In the assembly of the above-mentioned three parts, the pole 8 and the bushing 11 are partially melted by means of a gas-burner or the like to affix them and the terminal to each other. Soldering or other means such as laser beam welding, electric arc welding or high frequency induction heating may be used.

Figure 2:
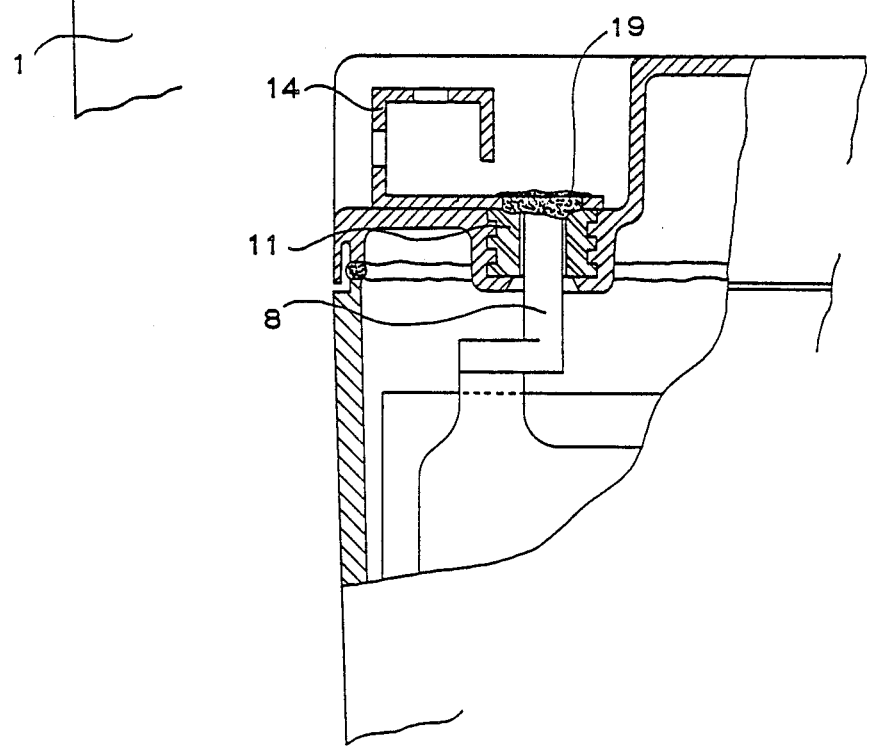
FIG. 2 is a fragmentary sectional view of a lead-acid storage battery of an embodiment of the invention after fixing a connecting terminal.

FIG. 2 and FIG. 3 illustrate a condition in which the above-mentioned three parts are of fixed to each other via a fixing portion 19. In order to facilitate the assembly and improve electric conductivity, the connecting terminal 14 may be plated or metal-sprayed with material electrically conductive such as tin or copper. Further, the terminal 14 may be treated by dipping or hot dipping, dipped the terminal 14 coated with flux is dipped in molten solder and thereby coating the terminal 14 with solder.

In a battery for a motorcycle, it is generally impossible to avoid contact between electrolyte and water at the terminal. If the terminal is made from soft iron, it will corrode in a short period of time. This can be effectively prevented by coating the terminal with an appropriate metal such as copper, lead, nickel, chrome by means of plating, metal spraying or dipping.

Motorcycles are usually equipped with electric starter motors. In those motorcycles, the batteries have cranking current of about 100 ampere. Therefore, each terminal of the battery must be tightly fixed to the terminal of the wire harness by bolt and nut. Thus, the stress corresponding to the torque of 40 kg-cm or more is applied to the terminal of the battery from the bolt in the bolt-insertion hole. In the embodiment of the invention, the terminal can have a strength resistive to the torque of 40-60 kg-cm caused by the bolt in the bolt-insertion hole, when it is formed from a strip of soft iron (plated with lead) being 13 mm in width and 1.6 mm in thickness.

Figure 4:
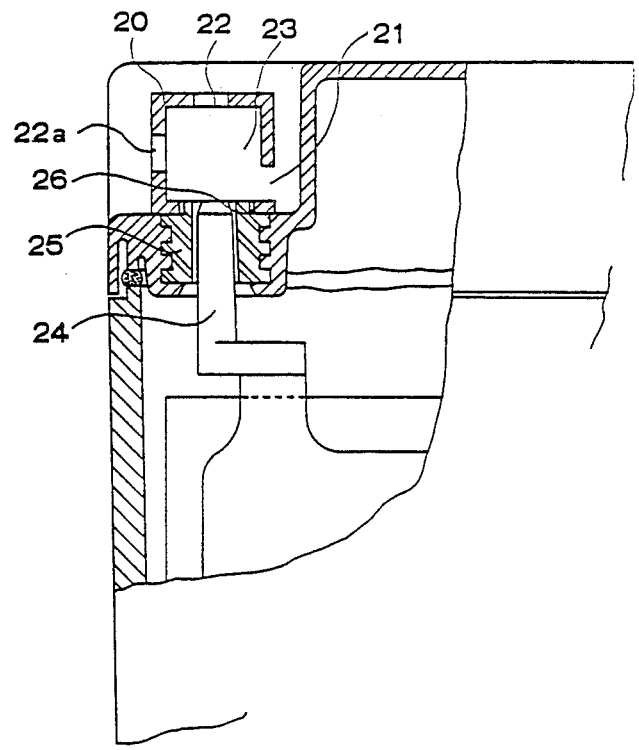
FIG. 4 is a fragmentary sectional view of a lead-acid storage battery according to another embodiment of the invention before fixing a connecting terminal.

FIG. 4 illustrates an another embodiment of the invention in which the connecting terminal 20 has a section of a substantially square shape, and is provided with a recess 21 at an inner side wall, bolt-insertion holes 22 and 22a at the outer side and upper walls, respectively, and a space 23 therein for accommodating nuts connected to bolts in the holes 22 and 22a. The terminal 20 also includes a fixing hole 26 substantially vertically aligned to the upper hole 22. The fixing hole 26 is used to affix a pole 24, bushing 25 and the terminal 20 together.

Accordingly, the invention having features as depicted in the appended claims has following advantages.

(1) The connecting terminal 14, the bushing 11 and the pole 8 are formed as independent parts or members, and thus the bushing 11 and the pole 8 which are formed by the molded parts can have simple shapes.

Therefore, they are not damaged in the molding process.

(2) By the reason stated in the above item (1), manufacture of the connecting terminal does not require any special technique for designing and manufacturing the metal molds nor any special molding techniques for molding the products.

(3) Since no blocks made from synthetic resin are used, it is possible to prevent leaking of the electrolyte at the terminal and the sinking and breaking of the terminal.

(4) The contact region between the bushing 11 and the cover 3 can prevent the leak of the electrolyte because the molding pressure in the molding operation for the cover 3 can be increased, and thus the bushing 11 and the cover 3 tightly contact each other.

(5) Similar to a conventional block made from synthetic resin, there may be error in height of the pole 8. In a connecting terminal according to the present invention, since the pole 8 is inserted into the bushing 11, the error in the height neither reduces the fixing strength, nor affects relative positioning between the pole 8 and the bushing 11. Thus, the error in the height of the pole 8 does not affect the strength of the connecting terminal assembly at all.

(6) Since the terminal 14 is seated on the bottom surface of the concave or recessed portion 5 in the cover 3 and is fixed thereto, it does not sink even if a force is applied to it from above. The material and sizes of the terminal 14 can be selected in accordance with the required strength to withstand the torque caused by the bolt, and to keep the terminal 14 fixed to the bushing 11. Therefore, the terminal 14 can not broken by stress corresponding to a torque less than 40 kg-cm.

(7) If only the cost and strength are taken into consideration, it is desirable to make the terminal 14 by a stamped strip of soft iron. However, the soft iron strip itself has problems with fixability to lead or the lead alloy as well as with corrosion. According to the invention, the soft iron strip can coated with lead, copper or the like.

(8) In the embodiment in FIG. 1, the assembly of the connecting terminal occupying a relatively large area in the cover, may be considered a disadvantage in some cases. However, according to the embodiment in FIG. 4, the assembly can occupy a relatively small area, which overcomes the above disadvantage.

(9) The load or force applied to the peripheries of the bolt-insertion holes 15 and 15a can cause a bending moment at the fixing portion 17 of the terminal 14. This moment can be reduced in the embodiment in FIG. 4 as compared with that in FIG. 1.

(10) The quantity of the material used for the terminal 20 in FIG. 4 is less than for that used in FIG. 1.

What is claimed is:

1. A lead-acid storage battery including a connecting terminal assembly which comprises;
    a bushing made from lead or lead alloy, buried in a cover of said battery in the same process as when said cover is molded, and including a hole into which a pole is fitted; and
    a connecting terminal made by press working a sheet of metal, except for lead or lead alloy, having good electrical conductivity, having at least one bolt-insertion hole and a space for accommodating a nut, fixed to the upper portion of said bushing, and having a strength resistive to a torque of 40 kg-cm or more caused by a bolt being inserted into said bolt-insertion hole.

2. A lead-acid storage battery of claim 1 wherein said connecting terminal is coated with material having good fixability with lead and lead alloy, and having good electric conductivity.

3. A lead-acid storage battery of claim 1 wherein said connecting terminal is coated with material having anti-corrosivity and having good electrical conductivity.

* * * * *